US011427712B2

(12) United States Patent
Trummer et al.

(10) Patent No.: US 11,427,712 B2
(45) Date of Patent: *Aug. 30, 2022

(54) THIN ALUMINUM PIGMENTS HAVING A NARROW THICKNESS DISTRIBUTION, METHOD FOR PRODUCING SAME, AND USE OF ALUMINUM PIGMENTS

(71) Applicant: Eckart GmbH, Hartenstein (DE)

(72) Inventors: Stefan Trummer, Nuremberg (DE); Michael Becker, Lauf (DE); Thomas Schlegl, Simmelsdorf (DE)

(73) Assignee: Eckart GmbH, Hartenstein (DE)

( * ) Notice: Subject to any disclaimer, the term of this patent is extended or adjusted under 35 U.S.C. 154(b) by 228 days.

This patent is subject to a terminal disclaimer.

(21) Appl. No.: 16/544,151

(22) Filed: Aug. 19, 2019

(65) Prior Publication Data
US 2019/0390060 A1    Dec. 26, 2019

Related U.S. Application Data

(63) Continuation of application No. 12/515,090, filed as application No. PCT/EP2007/011349 on Dec. 21, 2007, now Pat. No. 10,407,572.

(30) Foreign Application Priority Data
Dec. 22, 2006 (DE) ............ 10 2006 062 271.5

(51) Int. Cl.
C09C 1/64 (2006.01)

(52) U.S. Cl.
CPC ............ C09C 1/64 (2013.01); C09C 1/644 (2013.01); C09C 1/646 (2013.01); *C01P 2002/72* (2013.01); *C01P 2004/51* (2013.01); *C01P 2004/54* (2013.01)

(58) Field of Classification Search
None
See application file for complete search history.

(56) References Cited

U.S. PATENT DOCUMENTS

| | | | |
|---|---|---|---|
| 3,901,688 A | 8/1975 | Casey et al. | |
| 4,318,747 A | 3/1982 | Ishijima et al. | |
| 5,964,936 A | 10/1999 | Reisser | |
| 7,163,580 B2 | 1/2007 | Minami | |
| 7,309,391 B2 | 12/2007 | Nagano | |
| 8,016,909 B2 | 9/2011 | Wheeler | |
| 8,333,832 B2 | 12/2012 | Maennig et al. | |
| 2001/0007696 A1 | 7/2001 | Kaupp et al. | |
| 2001/0009130 A1 | 7/2001 | Korn et al. | |
| 2004/0024087 A1 | 2/2004 | Bruchmann et al. | |
| 2004/0097684 A1 | 5/2004 | Bruchmann et al. | |
| 2005/0238802 A1* | 10/2005 | Friese | C09D 5/36 427/162 |
| 2005/0252416 A1* | 11/2005 | Venturini | C09D 17/006 106/403 |
| 2006/0014854 A1 | 1/2006 | Minami | |
| 2007/0022901 A1 | 2/2007 | Kurze et al. | |
| 2007/0199478 A1* | 8/2007 | Schlegl | A61Q 3/02 106/404 |
| 2008/0087187 A1 | 4/2008 | Maul et al. | |
| 2010/0167079 A1* | 7/2010 | Wheeler | B22F 1/0055 428/567 |

FOREIGN PATENT DOCUMENTS

| | | |
|---|---|---|
| DE | 195 20 312 A1 | 12/1996 |
| DE | 196 35 085 A1 | 3/1998 |
| DE | 100 01 437 A1 | 7/2001 |
| DE | 20 2004 005 921 U1 | 7/2004 |
| DE | 103 15 775 A1 | 10/2004 |
| EP | 1 080 810 A1 | 3/2001 |
| EP | 1 424 371 A1 | 6/2004 |
| EP | 1 621 586 A1 | 2/2006 |
| JP | 2003-082258 A | 3/2003 |
| JP | 2003-096334 A | 4/2003 |
| JP | 2004-196838 A | 7/2004 |
| JP | 2004-269559 A | 9/2004 |

(Continued)

OTHER PUBLICATIONS

Valimet; "Spherical Aluminum Powder", Rev. 1.1, published Mar. 10, 2006; pp. 1-2. (Year: 2006).*
European Patent Office, Office Action dated Oct. 26, 2011, issued in corresponding European Patent Application No. 07 866 256-1218 (German language).
German Patent Office, Office Action dated Aug. 29, 2007, issued in corresponding priority German Application No. 10 2006 062 271. 5-44.
Hong, Seong-Hyeon, and Kim, Byoung-Kee, "Effects of lifter bars on the ball motion and aluminum foil milling in tumble ball mill," 2002, ELSEVIER, Materials Letters, vol. 57, pp. 275-279.
Japan Patent Office, Notice of Reasons for Rejection dated Aug. 21, 2012, issued in corresponding Japanese Patent Application No. 2009-541908 (with English language translation).
Patent Cooperation Treaty, International Search Report dated Sep. 25, 2008, issued in corresponding International Application No. PCT/EP2007/011349.

(Continued)

*Primary Examiner* — David J Blanchard
*Assistant Examiner* — Ivan A Greene
(74) *Attorney, Agent, or Firm* — Fitch, Even, Tabin & Flannery LLP

(57) ABSTRACT

The invention relates to aluminum pigments which are at least partially coated with lubricant, wherein the aluminum pigments have a relative breadth of thickness distribution $\Delta h$ of from 30% to less than 70%, as determined by a scanning electron microscope thickness count and as calculated on the basis of the corresponding cumulative breakthrough curve of the relative frequencies of occurrence, according to the formula $\Delta h = 100 \times (h_{90} - h_{10})/h_{50}$, and an X-ray diffractogram, measured on pigments in substantially plane-parallel orientation, having one or two main peaks which do not correspond to the [111] reflexes.
The invention further relates to a method for the production of said aluminum pigments and to uses thereof and also to nail varnishes and printing inks containing said aluminum pigments of the invention.

38 Claims, 3 Drawing Sheets

(56) References Cited

FOREIGN PATENT DOCUMENTS

| JP | 2004-315674 A | 11/2004 | |
|---|---|---|---|
| JP | 2006-522192 A | 9/2006 | |
| JP | 2007-138089 A | 6/2007 | |
| WO | 02/36695 A1 | 5/2002 | |
| WO | 02/36697 A1 | 5/2002 | |
| WO | 2004/087816 A2 | 10/2004 | |
| WO | WO-2004087816 A2 * | 10/2004 | ............ B22F 1/0011 |
| WO | 2005/118722 A1 | 12/2005 | |
| WO | 2007/020364 A1 | 2/2007 | |
| WO | 2008/009893 A2 | 1/2008 | |

OTHER PUBLICATIONS

Product Literature for CILAS 1064 Particle Size Analyzer, Oct. 15, 2005, pp. 1-2.

Seubert, J., et al., "PVD Aluminum Pigments: Superior Brilliance for Coatings and Graphic Arts," Coatings Journal, Bd. 84, A6 225264, Jul. 2001, pp. 240-245.

Valimet: "Spherical Aluminum Powder," Rev. 1.1, published Mar. 10, 2006, pp. 1-2.

Wheeler, Ian., "Metallic Pigments in Polymers," 1999, RAPRA Technology Ltd., Chapters 3 and 4, pp. 11-53.

\* cited by examiner

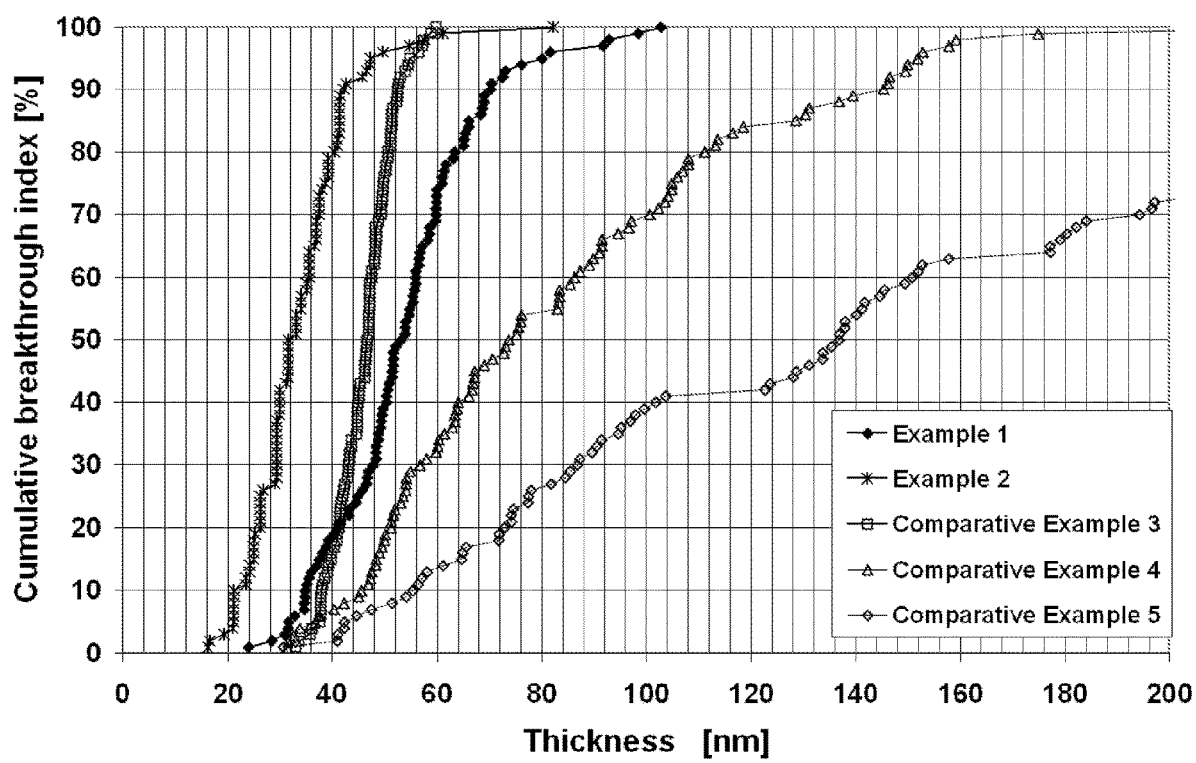

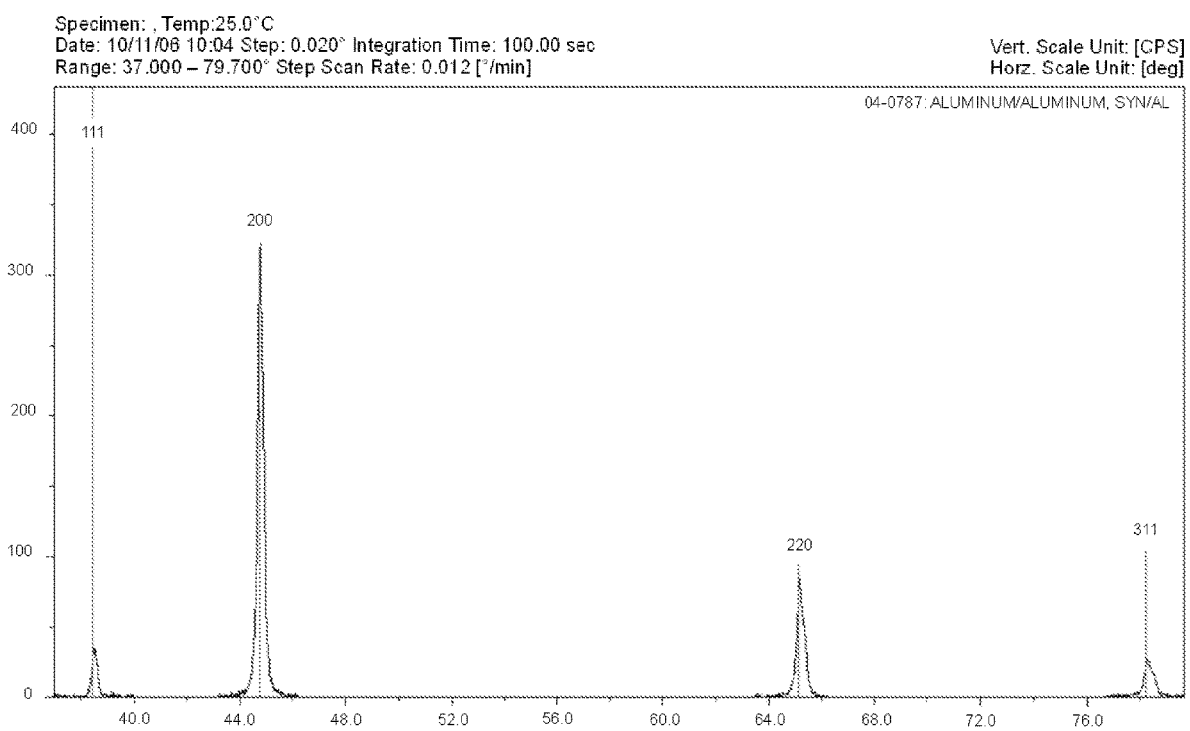
Fig. 2 X-ray diffractogram Example 1

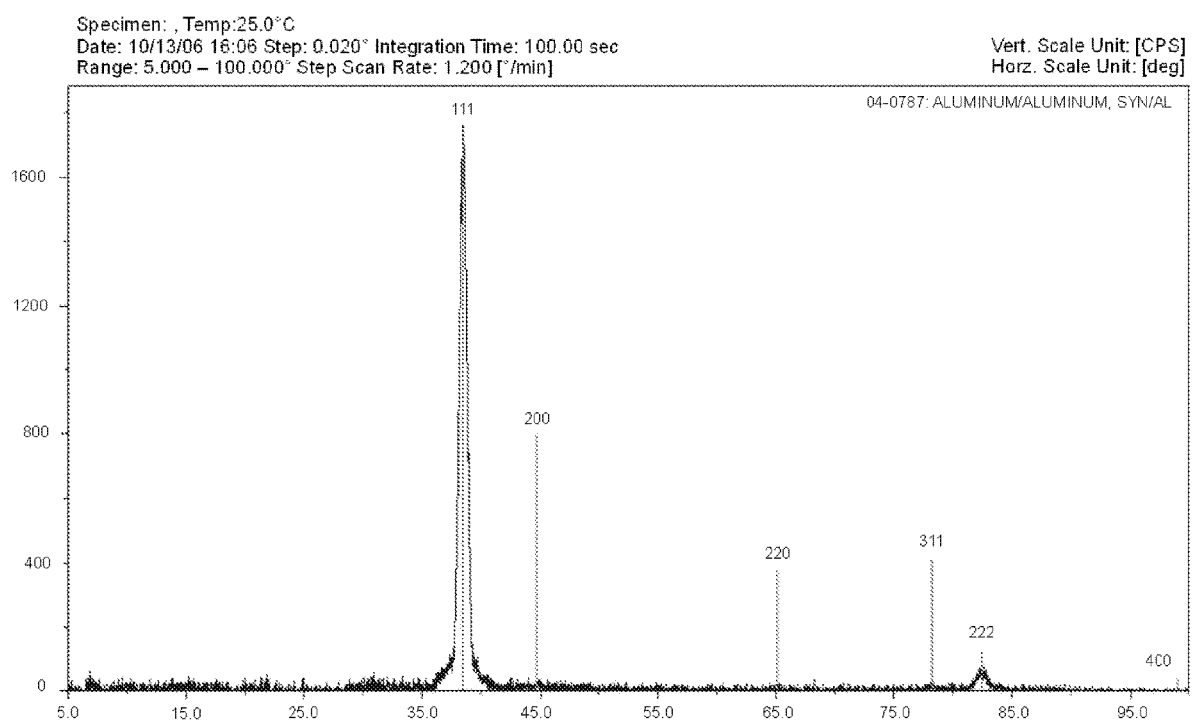
Fig. 3 X-ray diffractogram Comparative Example 3 (PVD Pigment)

THIN ALUMINUM PIGMENTS HAVING A NARROW THICKNESS DISTRIBUTION, METHOD FOR PRODUCING SAME, AND USE OF ALUMINUM PIGMENTS

CROSS-REFERENCE TO RELATED APPLICATIONS

This application is a continuation of prior application Ser. No. 12/515,090, filed May 15, 2009, which is a U.S. national phase application filed under 35 U.S.C. § 371 of International Application PCT/EP2007/011349, filed Dec. 21, 2007, designating the United States, which claims priority from German Application Number 10 2006 062 271.5, filed Dec. 22, 2006.

FIELD

The present invention relates to thin platelet-like aluminum pigments having a narrow thickness distribution and to a method for the production thereof. The invention also relates to uses of these aluminum pigments.

BACKGROUND

Platelet-like aluminum pigments are effect pigments and are distinguished by their unique metallic appearance and their high covering power. On account of the platelet-like structure of these effect pigments, they undergo orientation in the coating medium so as to be parallel to the substrate and cause a metallic effect due to the formation of a combination of many discrete tiny mirrors. This metallic effect is very strongly pronounced, particularly in wet lacquers. In the case of full-tone lacquers, there is a brightness effect dependent on the angle of observation and/or angle of incidence, which is also referred to as "flop". Good flop is influenced by many properties of the pigments. Thus their orientation, their size and size distribution, their surface texture (roughness) and the edge texture all play an important part.

The determining factor for a plane-parallel orientation of the pigments, which are also referred to as flakes, is not only surface chemistry incompatibilities of the aluminum pigments and the binder system but also and especially the form factor of the pigments. The form factor is understood as meaning the ratio of the length d to the thickness h of the pigments. The length is mainly measured by laser scattering methods. In this case, the $d_{50}$ index of the cumulative breakthrough curve is normally used.

Since the length of the aluminum pigments is highly dependent on the intended method of application, a high form factor and thus the best possible orientation can be particularly well achieved by varying the thickness of the pigments. Thin pigments undergo better orientation and therefore have higher flop. A further important characteristic of metallic coatings or printing inks is their high gloss. Gloss, inter alia, is a physiologically and psychologically related variable, but according to DIN 67 530, the "gloss power" of a plane surface is recorded by reflectometer values. The reflection is measured at the gloss angle relatively to a standard (as a rule a black mirror glass plate).

According to this DIN standard, highly glossy specimens (reflectometer value>70) are measured at an angle of incidence or reflection of 20° and medium glossy surfaces at 60°. A prerequisite for a good gloss of metallic coatings or printing inks is likewise a maximum plane-parallel orientation of the platelet-like pigments in the coating medium.

The most brilliant aluminum pigments with the highest gloss and flop are at present assigned to two general classes: on the one hand, the so-called "silver dollar pigments", which are prepared by wet grinding of aluminum shot, and, on the other hand, the so-called "PVD pigments".

With PVD pigments, extremely thin Al pigments having mean thicknesses of from approximately 20 nm to 60 nm are prepared. The thickness distribution of these pigments is extremely low. In this method aluminum is vapor-deposited in an ultrahigh vacuum on to a carrier film provided with a release-coat. This release coat is as a rule a polymer. Subsequently the vapor-deposited aluminum is separated—as far as possible—from the carrier film in a solvent and the metal film is comminuted mechanically or ultrasonically. The production of PVD pigments is described, for example, in J. Seubert and A. Fetz, "PVD Aluminum Pigments: Superior Brilliance for Coatings and Graphic Arts", Coatings Journal, Vol. 84, A6 225264, July 2001, pages 240-245.

On account of their extreme thinness, these PVD pigments exhibit excellent covering power. The thin pigments are so flexible that they virtually "cling" to the substrate. To display their optical possibilities they should therefore be applied to a smooth substrate.

A special effect is achieved in the case of so-called "reverse-side application" in the printing sector. Here, a transparent film is printed with a printing ink containing the PVD pigments. A metallic luster almost resembling a mirror is observed when the film is seen through the non-printed reverse side after the printing ink has cured. Preferred uses of this application form include headlight reflectors.

The extremely high production costs, however, constitute a drawback of these PVD pigments. Another disadvantage is that the release coat can barely be removed in its entirety from the pigment particles. This adherent polymer film can, however, lead to disadvantages. Thus, in the case of a printing ink, incompatibilities with the solvent used in the printing ink can occur. For example, polymer films which are suitable for toluene can be incompatible in solvents such as alcohols or water. This manifests itself in the formation of agglomerates, which completely destroy the desired decorative effect.

In particular, however, polymeric adhesions of this type can have a deleterious effect when the aluminum pigments, after production thereof, are provided with chemical protective coatings, such as are described, for example, in DE 196 35 085, in order to render them corrosion-resistant.

The same applies to stabilization by anticorrosive agents, such as are described, for example, in DE 100 01 437. In some circumstances, residues of adherent release-coat can lead to an uneven protective coating and hamper the application of a reproducibly produced protective layer.

In particular, the use of substrates coated in this way in water lacquers, in which unstabilized aluminum pigments produce undesirable gassing caused by evolution of hydrogen, is hardly reproducibly achievable with precoated substrates of this type.

A further serious drawback of PVD pigments is that they exhibit an extremely strong tendency to agglomerate. For this reason, PVD pigments are only supplied in highly dilute dispersions having an aluminum pigment content of usually from 10% to 20% by weight. To improve handling, it is desirable to use compositions having a higher aluminum pigment content.

Silver dollar pigments are distinguished from metal pigments obtained by communitive grinding by a relatively round shape and a relatively smooth surface.

U.S. Pat. No. 4,318,747 discloses fine aluminum effect pigments having an average size of less than 5 μm with leafing character, which possess a water coverage of at least 50,000 cm$^2$/g and a specific BET surface area of from 24 m$^2$/g to 93 m$^2$/g. From these data, roughness values in the range of from 2.4 to 9.3 can be calculated.

On account of the high degree of roughness of the surface of these pigments, there is extensive scattering of incident light and a consequent reduction in gloss, as compared with the smooth surface of a PVD pigment.

EP 1 621 586 A1 discloses aluminum effect pigments obtained by wet grinding in the thickness range of PVD pigments having an average thickness of from 25 nm to 80 nm and an average size of from 8 μm to 30 μm. However, the drawback of these pigments is that they do not exhibit the optical properties of PVD pigments.

Finally, EP 1 080 810 B1 relates to an aluminum pigment prepared by wet grinding of aluminum dust. The aluminum dust, which is also employed as an atomization product for pigment production and which has an average particle size of from 2 μm to 10 μm is not described in further detail.

EP 1 424 371 A1 discloses aluminum effect pigments obtained by grinding aluminum powder. According to the teaching of EP 1 424 371 A1, the aluminum powder employed has an average particle size ($D_{50}$) ranging from 1 μm to 10 μm.

The disadvantages of these pigments disclosed in EP 1 621 586 A1, EP 1 080 810 B1, and EP 1 424 371 A1 are that they have a very broad relative thickness distribution, which leads to a reduction in quality as regards the gloss properties of an article painted or printed with these pigments.

DE 103 15 775 A1 discloses thin covering aluminum effect pigments having an average thickness of from 30 nm to 100 nm and a relative thickness distribution of from 70% to 140%, which aluminum effect pigments exhibit a very high covering power and, on account of their very smooth surface, a gloss similar to that of PVD pigments. In terms of their optical properties, they represent a marked improvement over conventional silver dollar pigments with regard to covering power, gloss, and flop. But it has been seen that the aluminum pigments disclosed in DE 103 15 775 A1 sometimes exhibit inadequate transfer behavior, in particular in printing inks.

SUMMARY

It is an object of the present invention to provide very thin aluminum effect pigments not carrying any adherent polymer film and having excellent covering power, high gloss, and an improved metallic appearance as compared with conventional aluminum effect pigments known from the prior art and obtained by conventional wet grinding.

It is a further object of the invention to provide aluminum effect pigments, which additionally exhibit good transfer behavior when applying a printing ink containing these aluminum effect pigments. The aluminum pigments, particularly in printing inks, are intended to come very close to PVD pigments in respect of their optical properties, but to be significantly easier to produce and handle than the latter. In particular, the aluminum pigments are intended to have a markedly reduced tendency to agglomerate as compared with PVD pigments.

Furthermore, pigments of this type should be capable of being prepared by a more cost-effective method than is the case with the expensive production of aluminum effect pigments using the PVD production method.

This object is achieved by the provision of platelet-like aluminum pigments having
a) a mean thickness $h_{50}$ of from 15 nm to 75 nm as determined by a scanning electron microscope thickness count,
b) a relative breadth of thickness distribution Δh of from 30% to less than 70%, as determined by a scanning electron microscope thickness count and as calculated on the basis of the corresponding cumulative breakthrough curve of the relative frequencies of occurrence, according to the formula $\Delta h=100\times(h_{90}-h_{10})/h_{50}$, and
c) an X-ray diffractogram, measured on pigments in substantially plane-parallel orientation, having one or two main peaks which do not correspond to the [111] reflexes.

Preferred developments of the aluminum effect pigments of the invention are defined in the subclaims 2 to 16.

The object underlying the invention is furthermore achieved by a method as defined in claim 17 for the production of aluminum effect pigments as defined in any one of claims 2 to 16, which comprises the following steps:
a) providing aluminum shot exhibiting a particle size distribution having a $d_{10}<3.0$ μm, a $d_{50}<5.0$ μm, and a $d_{90}<8.0$ μm,
b) grinding the aluminum shot defined under a) using a grinder in the presence of solvent and lubricants and grinding media having an individual weight of from 2 mg to 13 mg.

Preferred developments of the method are defined in the subclaims 18 to 24.

The object of the invention is further achieved by the use of aluminum effect pigments as defined in claim 25 or claim 26, and a nail varnish containing the aluminum effect pigments and defined in claim 27, and a UV-stable printing ink containing the aluminum effect pigments and defined in claim 28.

The platelet-like aluminum pigments or aluminum effect pigments of the invention are also referred to hereinafter as "aluminum pigments" for the sake of simplicity.

BRIEF DESCRIPTION OF THE DRAWINGS

FIG. 1 illustrates the cumulative breakthrough curves of the thickness distribution of the example of the invention and Comparison Examples 3 to 5;

FIG. 2 is an X ray diffractogram of Example 1; and

FIG. 3 is an X ray diffractogram of Comparative Example 3 (pvd pigment).

DETAILED DESCRIPTION

The invention relates to platelet-like aluminum pigments having
a) a mean thickness $h_{50}$ of from 15 nm to 75 nm as determined by a scanning electron microscope thickness count,
b) a relative breadth of thickness distribution Δh of from 30% to less than 70%, as determined by a scanning electron microscope thickness count and as calculated on the basis of the corresponding cumulative breakthrough curve of the relative frequencies of occurrence, according to the formula $\Delta h=100\times(h_{90}-h_{10})/h_{50}$, and
c) an X-ray diffractogram, measured on pigments in substantially plane-parallel orientation, having one or two main peaks which do not correspond to the [111] reflexes.

The aluminum pigments of the invention possess a very high covering power on account of their small mean thickness. The covering power of a pigment is usually defined as the area covered per unit weight of pigment. The smaller the mean thickness of the aluminum pigment, the larger the area covered by the pigment and consequently the greater the covering power of the aluminum pigment.

Thin pigments having a narrow thickness distribution advantageously stack more evenly in the coating medium than conventional aluminum pigments having a broad thickness distribution. With conventional aluminum pigments, uneven stacking of the pigments can readily occur. Thus, very thick pigments can, in particular, serve as "spacers" and therefore adversely affect the orientation of the surrounding or adjoining pigments. This adversely affects gloss, flop, and, under certain circumstances, the covering power. This has a particularly unfavorable effect on prints. Compared with paint coatings, prints have a substantially smaller thickness and a lower binder content.

The very thin aluminum pigments of the invention having a narrow thickness distribution exhibit, surprisingly, a thickness distribution that is similar to that of PVD pigments and such pigments are therefore similar in their optical properties to PVD pigments, but are significantly easier and cheaper to make than PVD-pigments.

It is difficult to determine the exact mean thickness of platelet-like metal pigments. In practice, the pigment thickness is determined by measuring the water coverage (spreading index, DIN 55923) and/or by means of a scanning electron microscope (SEM). Only the mean thickness h of the pigments, but not the thickness distribution, can be calculated from the water coverage. The water coverage method fails in the case of PVD pigments, which show a very marked tendency to agglomerate. Preparation for the spreading test involves drying of the pigments, which leads to irreversible agglomeration phenomena in the case of PVD pigments. Therefore, for the purposes of the present invention, the mean thickness of the aluminum pigments of the invention is determined by means of a scanning electron microscope (SEM). Using this method, an adequate number of particles should be measured so as to realize a representative statistical evaluation. Customarily, approximately 100 particles are measured.

The thickness distribution is advantageously presented in the form of a cumulative breakthrough curve. The $h_{50}$ value of the thickness cumulative breakthrough curve is taken as a suitable mean value. A measure of the breadth of distribution $\Delta h$, also called span, is given by the following formula:

$$\Delta h(\%) = 100 * \frac{h_{90} - h_{10}}{h_{50}}, \qquad (I)$$

in which the indices relate to the respective values of the cumulative breakthrough distribution.

In the case of the mean thickness $h_{50}$ of the aluminum pigments of the invention calculated from the score obtained in the scanning electron microscope thickness count ($h_{50}$ index of the cumulative breakthrough curve), the mean thickness $h_{50}$ calculated is from 15 nm to 75 nm, preferably from 18 nm to 70 nm, more preferably from 25 nm to 60 nm and very preferably from 30 nm to 55 nm.

Below a mean thickness of 15 nm, the pigments become too dark, which can be attributed to the loss of the metallic reflective capacity while retaining the high absorption properties of the aluminum. Furthermore, the mechanical properties of the aluminum are changed unfavorably and the pigments become too brittle. Above a mean thickness of 75 nm, the good optical properties are increasingly impaired. However, there occurs no noticeable impairment up to a mean thickness of 75 nm.

The pigments of the invention preferably possess a relative breadth of thickness distribution $\Delta h$ of from 30% to 70%, more preferably from 35% to 67%, still more preferably from 40% to 65% and most preferably from 40% to 60%.

Above a $\Delta h$ of 70%, the advantageous properties of the aluminum pigments can no longer be observed. In particular, the high gloss of so-called "reverse-side applications" comparable to that of PVD pigments could no longer be found. Furthermore, these pigments having a $\Delta h$ of more than 70% sometimes exhibit problems relating to the transfer behavior in printing applications. Hitherto, it has not been possible to produce pigments having a relative breadth of thickness distribution $\Delta h$ of less than 30%.

In another preferred embodiment, the aluminum pigments of the invention have a mean thickness $h_{50}$ of from 25 nm to 60 nm and a span $\Delta h$ of from 35% to 67%. Another particularly preferred embodiment of the aluminum pigments of the invention is characterized by a mean thickness $h_{50}$ of from 25 nm to 55 nm and a span $\Delta h$ of from 35% to 65%.

The aluminum pigments of the invention differ significantly from conventional PVD pigments in their behavior during X-ray diffractometry. In order to investigate specimens of platelet-like aluminum pigments by means of X-ray diffractometry (XRD, X-ray Reflection Diffraction), the pigments are previously oriented so as to be substantially plane-parallel relative to the substrate of the specimen. Basically, any commercially available X-ray diffractometer is suitable for this purpose.

For the purposes of the invention, a substantially plane-parallel arrangement means that at least 80% of the pigments are parallel to the substrate within a tolerance range of +/−15°.

It is established that PVD pigments always have a main peak at the reflex of the [111] plane. By a [111] plane is meant the Miller's indices. The [111] plane corresponds to the densest possible plane of a metal undergoing face-centered cubic crystallization. This result is known per se, since it is common knowledge that aluminum sputtered on to a film forms such crystals. However, it has been found, surprisingly, that the aluminum pigments of the invention do not have a main peak at the reflex of the [111] plane. The reflex of the plane, if at all present, is always weak. The main peak or, possibly, main peaks preferentially correspond to the reflexes of the [200] plane and/or the [220] plane. The main peak very preferentially pertains to the [200] plane.

Unlike PVD pigments, the intensity ratio [111]/[200] in the pigments of the invention is always <1. This ratio is preferably <0.5 and very preferably <0.1.

It is presumed that these properties reflect the plastic deformation state in which the aluminum pigments exist during the grinding process. The at least polycrystalline aluminum shot is exposed to strong shear forces during formative grinding. Shearing occurs between the individual crystallites, the most densely packed [111] plane obviously being the shear plane. Since the grinding process naturally occurs perpendicularly to the platelet surface, these planes are broken away from the platelet plane, this being reflected by a drop in the peak intensity in the diffractogram. At the same time, the peaks of the [200] and [220] planes are intensified.

It has been found, very surprisingly, that the aluminum pigments of the invention have a metallic gloss in "reverse-side applications" which has hitherto not been achieved in conventional aluminum pigments prepared by wet grinding, but has only been possible with PVD pigments.

A reverse-side application is understood to mean that a printing ink pigmented with metal effect pigments is printed on a transparent film. When the cured print is viewed through the unprinted side of the film, in which case an almost mirror-like effect is observed when PVD pigments are used. The PVD pigments cling tightly to the film owing to their small thickness and low thickness distribution. Surprisingly, a similar effect can be achieved with the aluminum pigments of the invention. The small overall thickness of the pigments and the small breadth of thickness distribution are presumably the factors causing this effect.

Furthermore, the determining factor for plane-parallel orientation of the pigments is not only surface chemistry incompatibilities of the aluminum pigments and the binder system but also the form factor, which is another important characteristic determining the properties of the platelet-like aluminum pigments of the invention.

The form factor f is understood as meaning the ratio of the average length to the average thickness of the aluminum pigment platelets.

The length d (diameter) is determined in laser scattering tests on the basis of the Fraunhofer and/or the Mie diffraction theory. The evaluation of the diffraction data is based on a model aiming at the diameter of an equivalent sphere. No absolute values are therefore obtained, but the diameters measured have gained acceptance as reliable relative values for the description of the size characteristics of platelet-like metal pigments.

As regards length, the aluminum pigments of the invention do not differ fundamentally from aluminum pigments conventionally available on the market which have been prepared by wet grinding. Specifically, the sizes depend on the intended application.

The $d_{50}$ indices of the length distribution of the pigments are preferably above 3 µm, more preferably in a range of from 4 µm to 50 µm, even more preferably from 5 µm to 45 µm, still more preferably from 8 µm to 40 µm, very preferably from 10 µm to 30 µm, and most preferably from 15 µm to 25 µm.

Furthermore, fine pigments are preferably in the magnitude of from 3 µm to 15 µm and very preferably from 5 µm to 12 µm. Pigments of such type additionally preferably exhibit non-leafing properties. They are ground, for example, with oleic acid as the lubricant and are therefore coated with this substance. Pigments of this type are especially suitable for reverse-side applications in the printing sector.

The dimensionless form factor f is defined in the present invention as:

$$f = 1000 * \frac{d_{50}(\mu m)}{h_{50}(nm)}. \qquad (II)$$

The $d_{50}$ index of the pigment length corresponds to 50% of the cumulative breakthrough curve, measured and evaluated in the form of a volume distribution of equivalent spheres. The mean value $h_{50}$ of the thickness distribution is determined as described above.

The pigments of the invention are distinguished by a form factor f of from 200 to about 1,500. Preferably, the pigments of the invention possess a form factor f of from 210 to 1,000, more preferably from 220 to 500 and most preferably from 230 to 400.

A comparatively low content of active aluminum is another characteristic of the pigments of the invention. The content of active aluminum can be determined by completely dissolving a defined amount of aluminum pigments in an alkaline solution and recording the resulting hydrogen volumetrically under temperature-controlled conditions. The active aluminum content of these pigments lies in a range of from 80% to 92% and preferably from 85% to 90%, based on the total weight of the aluminum pigments. These values are below those of conventional aluminum pigments obtained by wet grinding and having a content of active aluminum of from 93% to 97% by weight.

The residual content of non-active aluminum in the pigment can be attributed to aluminum oxide forming naturally on the surface, and to fatty acids bound to the surface. On account of the very low thickness of the aluminum pigments of the invention, they possess a comparatively high relative oxide content. The content of fatty acids is also comparatively high. The latter can be roughly estimated from the C content determined by elemental analysis. In the case of the pigments of the invention, the residual content is typically from 0.3% to 1.2% by weight and preferably from 0.4% to 1.0% by weight, as measured on aluminum powders previously washed with acetone or comparable solvents and subsequently dried.

The aluminum pigments of the invention are very thin pigments with a very narrow thickness distribution. Pigments of this type possess a high covering power. The aluminum pigments of the invention preferably exhibit a thickness distribution having an No index of less than 110 nm, preferably less than 100 nm, and more preferably less than 75 nm. Furthermore, the aluminum pigments of the invention have a thickness distribution having an $h_{95}$ index of less than 150 nm, preferably less than 120 nm, and more preferably less than 100 nm. The $h_{99}$ value of the thickness distribution of the aluminum pigments of the invention is preferably less than 140 nm, more preferably less than 110 nm, and most preferably less than 90 nm.

With these very narrow thickness distributions, there are hardly any pigment platelets having a thickness substantially exceeding 100 nm.

The narrow thickness distribution advantageously causes very good stacking of the aluminum pigments of the invention in a coating medium, for example, a lacquer or a printing ink. With the aluminum pigments of the invention, for example, it is possible to obtain lacquers displaying good coverage and very high gloss and very good flop when applied in very small layer thicknesses, for example, a layer thickness of less than 10 µm.

Particularly in the automobile lacquering sector, there is a need for small layer thicknesses primarily for cost-saving reasons. Hitherto, basecoat layer thicknesses have been typically in the region of 15 µm. Even now, smaller layer thicknesses are routinely used on very curved shaped parts, such as door handles. It would be desirable if small layer thicknesses down to less than 10 µm could be realized. However, the layer thickness should not be too low, as otherwise problems of adhesion, coverage and/or pigmentation will arise.

In the case of printing inks, the binder contents and the layer thicknesses are generally much lower than in lacquers. This particularly applies to gravure printing inks. Gravure printing inks pigmented with conventional aluminum pigments exhibit a solids content of approximately 40% by weight. Films printed with gravure printing inks have a wet film layer thickness of from about 3 µm to 6 µm and a dry film layer thickness of from about 1.5 µm to 3 µm. In the case of gravure printing inks pigmented with PVD pigments, the solids contents are from approximately 15% to 20% by weight of the total gravure printing ink. This is associated with dry film layer thicknesses of from only 0.5 µm to 1.5 µm. In the case of these extremely small layer thicknesses, a substantially even, plane-parallel orientation of the metal pigments is necessary, particularly in reverse-side applications. Hitherto, this orientation could be achieved only when using PVD pigments. The metal pigments of the invention obtained by wet grinding exhibit a similar mean particle thickness and a similar particle thickness distribution. Only those pigments of this type, not hitherto accessible, can exhibit an optical effect in reverse-side application that is comparable to that obtained when using PVD pigments. Virtually no differences in the optical quality of the metal pigments of the invention compared with PVD pigments can be observed in gravure applications.

In a further embodiment of the invention, the aluminum pigments of the invention are subsequently covered or coated with a passivating inhibitor and/or a passivating anticorrosive layer. Only with coatings of this type is it possible to safely use the pigments of the invention in water lacquers and/or in external coatings.

The mechanism of action of the passivating layers is complex. In the case of inhibitors, it is usually based on steric effects. The major portion of the inhibitors therefore also has an orienting action as regards leafing or non-leafing, i.e. of being buoyant or non-buoyant in the coating medium.

The inhibitors are usually added in low concentrations in the order of magnitude of from 0.5% by weight to 15% by weight based on the weight of the aluminum pigments employed.

Suitable inhibition agents are preferably the following:
organically modified phosphonic acids or esters thereof of the general formula

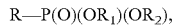
R—P(O)(OR$_1$)(OR$_2$), in which R stands for alkyl, aryl, alkylaryl, arylalkyl, and alkyl ether, in particular ethoxylated alkyl ether, and R$_1$, R$_2$ stand for H, C$_n$H$_{2n+1}$, where n is 1 to 6, in which the alkyl can be branched or unbranched. R$_1$ and R$_2$ can be the same or different.

organically modified phosphoric acids and esters thereof of the general formula

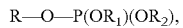
R—O—P(OR$_1$)(OR$_2$), in which R stands for alkyl, aryl, alkylaryl, arylalkyl, and alkyl ether, in particular ethoxylated alkyl ether and R$_1$, R$_2$ stand for H, C$_n$H$_{2n+1}$, in which n is 1 to 6 and the alkyl can be branched or unbranched.

Pure phosphonic acids or esters thereof or phosphoric acids or esters thereof or any desired mixtures thereof can be used.

In the case of grinding of the aluminum shot in predominantly aqueous solvents, inhibitors of this type are used as grinding aids in order to prevent the evolution of hydrogen during the grinding process, which would constitute a safety hazard.

Furthermore, the passivating inhibitor layer can consist of or include corrosion-inhibiting organically functionalized silanes, aliphatic or cyclic amines, aliphatic or aromatic nitro compounds, heterocyclics containing oxygen, sulfur and/or nitrogen such as, for example, thiourea derivatives, sulfur and/or nitrogen compounds of higher ketones, aldehydes, and alcohols, for example, fatty alcohols, or thiols, or mixtures thereof. The passivating inhibitor layer can, however, also consist of the aforementioned substances. Organic phosphonic acids and/or phosphoric acid esters or mixtures thereof are preferred. If amine compounds are used, these preferably comprise organic radicals having more than 6 carbons. Amines of this type are preferably used together with organic phosphonic acids and/or phosphoric acid esters or mixtures thereof.

Passivation by means of anticorrosion barriers having a chemical and physical protective action can be realized in a variety of ways.

Passivating anticorrosion layers, which guarantee the aluminum pigments particularly good corrosion protection, include or consist of silicon oxide, preferably silicon dioxide, chromium aluminum oxide, which is preferably applied by a chromating method, zirconium oxide, aluminum oxide, polymerized synthetic resins, phosphate, phosphite or borate, or mixtures thereof.

Silicon dioxide and chromium aluminum oxide layers (chromation) are preferred. Furthermore, aluminum oxide, aluminum hydroxide or hydrated aluminum oxide layers, such as are described in DE 195 20 312 A1, are preferred.

The SiO$_2$ layers are preferably prepared by sol-gel methods with average layer thicknesses of from 10 nm to 150 nm and preferably from 15 nm to 40 nm, in organic solvents.

In the following, the method for the production of the aluminum pigments of the invention will be described. This is distinguished by extremely gentle formative grinding of aluminum shot. Specifically, the method consists of the following steps:

a) taking aluminum shot having a particle size distribution having a d$_{10}$<3.0 µm, a d$_{50}$<5.0 µm, and a d$_{90}$<8.0 µm,
b) grinding the aluminum shot defined under a) using a grinder in the presence of solvent and lubricants and grinding media having an individual weight of from 2 mg to 13 mg.

The aluminum shot is preferably prepared in atomizers by atomization of liquid aluminum, preferably an aluminum melt. The shot includes or consists of aluminum particles having a preferably approximately round shape. It is particularly preferred to use aluminum shots having aluminum particles of a spherical to slightly ellipsoidal shape. The aluminum shot obtained after atomization of an aluminum melt is classified, in accordance with a preferred variant, so as to achieve the desired particle size distribution, which can also be referred to as a range of particle sizes.

The aluminum shot is a very fine metal shot having a very narrow size distribution. The range of size distribution is usually determined by laser diffraction spectrometry, and the particle size can be determined from the laser light diffraction. Laser diffraction spectrometry can be carried out, for example, with the apparatus Helos, supplied by Sympatec GmbH, Clausthal-Zellerfeld, Germany, according to manufacturer's specifications.

The size distribution has a d$_{shot,10}$<3.0 µm, a d$_{shot,50}$<5.0 µm, and a d$_{shot,90}$<8.0 µm. The size distribution preferably has a d$_{shot,10}$<0.6 µm, a d$_{shot,50}$<2.0 µm, and a d$_{shot,90}$<4.0 µm.

Following the atomization step, the shot can be obtained in the desired narrow size distribution by means of appropriate classification steps. The classification can be carried out using air classifiers, cyclones, and other known devices.

The aluminum pigments of the invention can be prepared only with the use of such fine and relatively narrow-fraction aluminum shot. As the lower limit, the size distribution has the following characteristics: d$_{shot,10}$>0.15 µm, d$_{shot,50}$>0.8

μm, and $d_{shot,90} > 2.0$ μm. Consequently, the aluminum shot used comprises predominantly no aluminum shot in nanometric dimensions.

Aluminum shots having $d_{shot,50}$ values ranging from 0.9 μm to 3.0 μm are more preferred and those having values ranging from 0.95 μm to 2.5 μm are most preferred.

The aluminum shots preferably used comprise a span of size distribution, which is usually defined as $\Delta d_{shot} = (d_{shot,90} - d_{shot,10})/d_{shot,50}$, of from 30% to 200% and more preferably from 40% to 180% and most preferably from 50% to 170%.

The use of such a fine aluminum shot having a narrow size distribution is essential for the production of the metal pigments of the invention. Not all of the aluminum shot particles are transformed evenly during the formative grinding: this means that some particles are transformed to a greater extent whilst some of the shot particles undergo transformation later in the grinding process. One reason for this is the fact that the probability of a particle being transformed is dependent on its size. Particles which have already been pre-transformed to form platelets thus have a higher specific surface area than untransformed shot and, accordingly, face a higher probability of being transformed further. The breadth of size distribution of the shot is thus taken into account not only in the size distribution of the aluminum particles formed therefrom but also in the thickness distribution. Therefore, aluminum shot having appropriately low size variance must be used to obtain narrow thickness distributions.

The aluminum shot used for producing the platelet-like aluminum pigments of the invention further has a very low oxide content. The content of aluminum oxide in the aluminum shot is determined by melting the aluminum shot with carbon and determining the resulting carbon monoxide by means of a commercially available apparatus (e.g. Omat 3500 supplied by JUWE GmbH). The content of aluminum oxide in the aluminum shot is less than 5% by weight, preferably less than 1.5% by weight, and very preferably less than 1.0% by weight based on the aluminum shot.

In order to achieve these low oxide contents, the atomization step is preferably carried out in an inert gas atmosphere. Nitrogen and/or helium are preferably used as inert gases.

The purity of the aluminum used in the atomization process is preferably from 99.0% to more than 99.9% by weight. The shot can contain the usual alloy components (e.g. Mg, Si, Fe) in appropriately small amounts.

The aluminum shot is ground using a grinder, preferably a ball mill, or a stirred ball mill, in the presence of solvent and lubricants acting as grinding aids, and in the presence of grinding media, which individually weigh from 1.2 mg to 13 mg. On account of the extremely gentle manner of grinding, this type of grinding takes a comparatively long time. The grinding time is preferably from 15 h to 100 h, more preferably from 16 h to 80 h and very preferably from 17 h to 70 h.

According to a preferred development of the invention, the grinding media individually weigh from 2.0 mg to 12.5 mg and very preferably from 5.0 mg to 12.0 mg. The grinding media used are preferably spherical media and more preferably balls.

Balls having a very smooth surface, as round a shape as possible, and of a substantially uniform size are preferred. The ball material can be steel, glass or ceramics, such as, for example, zirconium oxide or corundum. The temperatures during the grinding process are in the range of from 10° C. to 70° C. Temperatures ranging from 25° C. to 45° C. are preferred.

Balls made of glass and having a mean individual weight of from 2.0 mg to 12.5 mg are particularly preferred.

Balls made of steel and having a mean individual weight of from 1.2 mg to 4.5 mg, preferably a mean individual weight of from 1.4 mg to 4.0 mg and more preferably a mean individual weight of from 2.0 mg to 3.5 mg are used.

The long grinding times lead to a large number of pigment/ball impacts. As a result, the pigment is very uniformly shaped, which is manifested by a very smooth surface and a very narrow thickness distribution.

With respect to grinding in a ball mill, the critical speed of rotation $n_{crit}$ is an important parameter which indicates when the balls begin to press against the mill wall due to centrifugal forces, at which point virtually no more grinding takes place:

$$n_{crit} = \sqrt{\frac{g}{2\pi^2} * \frac{1}{D}}$$

wherein D is the diameter of the drum
and g is the gravitational constant.

The speeds of rotation of the ball mill are preferably from 25% to 68%, more preferably from 28% to 60%, and even more preferably from 30% to less than 50% and most preferably from 35% to 45% of the critical speed of rotation $n_{crit}$.

Low speeds of rotation favor slow transformation of the aluminum shot. In order to cause slow transformation, light grinding spheres are also preferably used in the method of the invention. Grinding spheres individually weighing more than 13 mg transform the aluminum shot too vigorously, which leads to premature breakage thereof.

Unlike conventional grinding processes, the aluminum shot in the method of the invention is for the major part not ground or comminuted, but transformed extremely gently over a relatively long period of time.

Grinding with very light balls at low speeds of rotation and for a long grinding time leads to an extremely gentle grinding process, in which very thin aluminum pigments are obtained. Since the aluminum shot employed exhibits a very narrow particle size distribution, the aluminum effect pigments of the invention also exhibit a very uniform thickness distribution.

Grinding can take place in a solvent at a ratio by weight of solvent to aluminum shot of from 2.5 to 10 and at a ratio by weight of the grinding spheres to aluminum shot of from 20 to 110 and using lubricants as grinding aids.

A large number of compounds can be used as lubricants in the grinding process.

In this context, mention may be made of the fatty acids containing alkyl radicals having from 10 to 24 carbons which have already been in use for many years. Preferably, stearic acid, oleic acid, or mixtures thereof are used. When stearic acid is used as a lubricant, leafing pigments are formed. Oleic acid, on the other hand, leads to non-leafing pigments. Leafing pigments are characterized in that they are buoyant in a coating medium, such as a lacquer or a printing ink, i.e. they float on the surface of the coating medium. Non-leafing pigments congregate, on the other hand, within the coating medium. Long-chain amino compounds, for example, can also be added to the fatty acids. The fatty acids can be of animal or vegetable origin. Likewise, organic phosphonic acids and/or phosphoric acid esters can be used as lubricants.

The lubricant should not be employed too sparingly, since otherwise the vigorous transformation of the aluminum shot can lead to very large surface areas of the prepared platelet-like aluminum pigments that are only inadequately saturated by adsorbed lubricant. In this case, cold welding occurs. Typical amounts are therefore from 1% to 20% by weight, preferably from 4% to 18% by weight, and very preferably from 8% to 15% by weight of lubricant based on the weight of aluminum employed.

The choice of solvent is not critical as such. It is possible to employ customary solvents such as white spirit, solvent naphtha, etc. The use of alcohols, such as isopropanol, ethers, ketones, esters, etc. is also possible.

Likewise, water (at least as the major portion) can be used as solvent. In this case, the lubricants employed, however, should have a marked anticorrosive action. Phosphonic acids and/or phosphoric acid esters, which can also carry ethoxylated side chains, are preferred. The addition of corrosion inhibitors during the grinding process is also advantageous.

Due to the manufacturing method of the invention, the aluminum pigments are free from adherent polymer films, which is a great advantage. The aluminum pigments of the invention therefore do not suffer from the disadvantages of aluminum pigments still encumbered with residues of the release coats, such as are prepared by PVD methods. Moreover, their manner of production is cheaper than the complicated PVD production methods. The separation of the resulting aluminum pigments from the grinding media, preferably grinding spheres, can be carried out in conventional manner by screening.

After the aluminum shot has been ground, the aluminum pigments obtained are separated from the grinding media, preferably grinding spheres.

In a further method step, the resulting aluminum pigments can be subjected to size classification. This classification should be carried out gently, in order not to destroy the thin aluminum pigments. It may involve, for example, wet screening, decantation, or alternatively separation by sedimentation caused, for example, by the action of gravity or by centrifugation. In wet screening, the coarse fraction is usually screened off. In the other methods, the fines, in particular, can be separated. Subsequently, the suspension is freed from excess solvent, for example, with the aid of a filter press, centrifuge and/or filter.

In the final step, further processing takes place to give the desired dosage form.

Although the metal pigments of the invention have a similar thickness and a similar thickness distribution to PVD pigments, they can, surprisingly, be handled more easily. In their dosage forms, the aluminum pigments of the invention are advantageously not restricted to a dilute dispersion form, as is customary in the case of PVD pigments.

Thus the paste form can be used in a manner similar to conventional aluminum pigments. The solids content is from 30% to 65% by weight, preferably from 40% to 60% by weight, and very preferably from 45% to 55% by weight, based on the total weight of the paste.

Furthermore, the aluminum pigments of the invention can be converted to a powder form, preferably a nondusting powder form, by drying. The dried powder can be further processed to give a nondusting metal powder by the addition of very small amounts of solvent, for example, from 1% by weight to less than 10% by weight, such as from 3% to 5% by weight, based on the total weight of powder and solvent, in a suitable homogenizer. Another method is to thoroughly dry the filter cake and then to retransform it to a paste with another solvent (rewetting).

Surprisingly, the aluminum pigments can alternatively be further processed by treating the filter cake with a suitable dispersion of a suitable resin to form granules, pellets, briquettes, tablets, or small cylinders. These dosage forms have the advantage that they do not form a dust, are easily metered, and are highly dispersible.

Pelletization can be carried out on a pelletizing plate in conventional manner. Tableting can take place in a tableting device. The small cylinders can be prepared by a molding method for aluminum paste or powder or by extruding an aluminum paste through an extruder and by chopping the extruded strings of paste by means of a rotating knife system. Granulation of the aluminum pigments of the invention can be carried out by, say, spray granulation.

The aluminum pigments of the invention can be provided, to great advantage, in the form of granules or pellets having high aluminum pigment contents of, say, from 90% by weight to 35% by weight and preferably from 70% by weight to 40% by weight.

On account of the very high specific surface area of the aluminum pigments of the invention, relatively large amounts of dispersing resin must be used, for example, for the process of pelletizing the aluminum pigments of the invention. It is preferred to use from 2% to 50% by weight and more preferably from 5% to 30% by weight of resin, based on the total formulation of the pellets.

Pelletization may be carried out using a large number of dispersing resins. Examples thereof are both natural and synthetic resins. They include, for example, alkyd resins, carboxymethyl and carboxyethyl cellulose resins, cellulose acetate, cellulose acetate propionate (CAP), and cellulose acetate butyrate (CAB), coumarol-indene resins, epoxide esters, epoxide-melamine, and epoxide-phenol condensates, ethyl and methyl cellulose, ethylhydroxyethyl cellulose, hydroxyethyl cellulose, hydroxypropylmethyl cellulose, ketonic and maleic acid resins, colophonium resins, melamine resins, nitrocellulose resins, phenolic resins and modified phenolic resins, polyacrylamide resins, polycarbonate resins, polyamide resins, polyester resins, polyether resins, polyurethane resins, and vinyl resins.

Of these polymeric resins, mention may be made in particular of acrylate copolymers and acrylic ester resins, polyacrylonitrile resins and acrylonitrile copolymer resins, copolymers of butadiene and vinylidene chloride, butadiene/styrene copolymers, methyl acrylate copolymere and methyl methacrylate copolymers; and polybutene resins, polyisobutylene resins, polyvinyl acetate resins, polyvinyl alcohol resins, polyvinyl chloride resins, polyvinyl ether resins, polyvinylpyrrolidone resins, and polystyrene resins. Further copolymers include styrene/maleic anhydride resins and styrene/shellac resins, vinyl chloride/vinyl acetate resins, vinyl chloride/vinyl ether resins and vinyl chloride/vinylidene chloride resins.

Naturally occurring resins such as gum arabic, gutta percha, casein, and gelatin are also suitable.

Aldehyde resins such as the Laropal series produced by BASF AG, Ludwigshafen are preferred. Furthermore, waxes are suitable binder materials. Here, natural waxes such as beeswax, candelilla wax, carnauba wax, montan wax, and paraffin wax may be mentioned by way of example. Synthetic waxes such as, for example, PE waxes are likewise suitable.

The aforementioned preparations can be very readily incorporated in, say, lacquer systems or printing inks without the occurrence of undesirable agglomeration of the aluminum pigments.

It has been found, surprisingly, that the tendency of the aluminum pigments of the invention to agglomerate is much lower than that of PVD pigments.

It is presumed that this effect has to do with the roughness of the aluminum pigments of the invention. The aluminum pigments of the invention exhibit a certain measure of production-specific roughness or waviness which prevents plane-parallel adherence, i.e. agglomeration, of aluminum pigments to one another without, surprisingly, there being any significant impairment of the optical properties, such as reflective capacity and gloss, of the aluminum pigments of the invention.

Unlike PVD pigments, superposed aluminum pigments of the invention exhibit, on account of their roughness or waviness, only point-to-point mutual contact surfaces. As a result—unlike PVD pigments—the formation of short-range forces of attraction, such as van der Waals forces or hydrogen bridges, is minimized and consequently agglomeration or aggregation is hindered.

The aluminum pigments of the invention are used in coatings, lacquers, printing inks, powder lacquers, plastics, and cosmetic formulations. Preferably, the aluminum pigments of the invention are used in printing inks and in nail varnish formulations. The printing inks, nail varnishes, and coatings of the invention possess a pronounced metallic appearance giving the impression of liquid metal.

The aluminum pigments of the invention are used to particular advantage in printing inks. The aluminum pigments of the invention are used very preferably in gravure printing inks, screen printing inks, or flexographic printing inks.

The aluminum pigments of the invention passivated by subsequent coatings are preferably used in water-based lacquers and in exterior coatings.

A further object of the invention is a printing ink containing the metal pigments of the invention, in particular, a liquid printing ink such as gravure printing ink, flexographic printing ink, or screen printing ink. Gravure printing inks, flexographic printing inks, or screen printing inks of this type contain solvents or solvent mixtures. They serve inter alia to dissolve the binder, but also to establish important performance characteristics of the printing inks, for example the viscosity or the drying rate.

Solvents used for liquid printing inks, such as flexographic and screen printing inks, include in particular low-boiling solvents. The boiling point is as a rule not more than 140° C. Higher-boiling solvents are employed only in smaller amounts for adjusting the drying rate. Screen printing inks are formulated similarly to flexographic or gravure printing inks but are merely made slightly more viscous and usually have solvents with a slightly higher boiling point. Examples of suitable solvents for liquid printing inks include ethanol, 1-propanol and 2-propanol, substituted alcohols such as ethoxypropanol, and esters, for example ethyl acetate, isopropyl acetate, n-propyl acetate and n-butyl acetate. It is naturally also possible to use mixtures of various solvents. For example, such a mixture may be a mixture of ethanol and esters, such as ethyl acetate or propyl acetate. For printing with flexographic printing plates, it is as a rule advisable for the content of esters in the total solvent not to exceed about 20% to 25% by weight. Water or a predominantly aqueous solvent mixture is also preferably used as the solvent for liquid printing inks.

Depending on the type of printing ink, the solvent is used usually in an amount of from 10 to 60% by weight, based on the sum of all components. However, in the case of the printing inks of the invention, a range of from 60% to 80% by weight of solvent has proved to be particularly advantageous.

Radiation-curable printing inks generally do not contain the abovementioned solvents but instead reactive diluents. Reactive diluents typically perform a dual function. On the one hand, they serve to crosslink or cure the printing ink. On the other hand, they serve, like conventional solvents (DE 20 2004 005 921 UI 2004.07.1), to adjust the viscosity. Examples thereof include butyl acrylate, 2-ethylhexyl acrylate and in particular polyfunctional acrylates, such as 1,4-butanediol di(meth)acrylate, 1,6-hexanediol di(meth)acrylate or trimethylolpropane tri(meth)acrylate.

In principle, binders customary for liquid printing inks can be used as binders for the metallic printing inks of the invention. A person skilled in the art will make a suitable choice according to the intended use and the desired properties. Examples of suitable binders include polyesters, polyamides, PVC copolymers, aliphatic and aromatic ketone resins, melamine/urea resins, melamine/formaldehyde resins, maleates, colophonium derivatives, casein and casein derivatives, ethylcellulose, nitrocellulose or aromatic or aliphatic polyurethanes. Polymers or copolymers of vinyl acetate, vinyl alcohol, acrylates, methacrylates, vinylpyrrolidone or vinyl acetals may also be used. Hyperbranched polymers having functional groups, for example hyperbranched polyurethanes, polyureas or polyesteramides, can be used to particular advantage, as disclosed in WO 02/36695 and WO 02/36697. It is naturally also possible to use mixtures of different polymeric binders, provided that the binders chosen do not have any undesired properties when blended with one another. The amount of all binders is usually from 5% to 40% by weight, based on the sum of all components of the printing ink.

Binders particularly preferred include, for example, nitrocellulose, ethylcellulose, hydroxyethyl cellulose, acrylates, polyvinyl butyrals and aliphatic and aromatic polyurethanes and polyureas, in particular hyperbranched polyurethanes and polyureas and mixtures thereof.

Particularly suitable binders for water-dilutable metallic printing inks are copolymers based on (meth)acrylic acid and/or esters thereof with styrene. Binders of this type are commercially available as solutions or dispersions for use in printing inks, for example under the name Zinpol® (supplied by Worlee). Further examples include aromatic and aliphatic aqueous polyurethanes, polyesters and aqueous polyamides.

Binders preferred for pasty printing inks include, for example, colophonium resins or modified colophonium resins. Examples of modified colophonium resins include those completely or partly esterified with polyols, for example glycerol or pentaerythritol.

Radiation-curable printing inks comprise binders having crosslinkable groups, for example olefinic groups, vinyl ether groups or epoxide groups. Here, the sum of the binders (including reactive diluents) is usually in a range of from 30% to 90% by weight of all components of the printing ink.

The metallic printing inks of the invention may furthermore comprise one or more auxiliaries or additives. Examples of additives and auxiliaries are fillers, such as calcium carbonate, hydrated alumina or aluminum silicate or magnesium silicate. Waxes increase the abrasion resistance and serve to improve slip. Specific examples thereof are polyethylene waxes, oxidized polyethylene waxes, petroleum waxes and ceresin waxes. Fatty acid amides can be used to increase the surface smoothness. Plasticizers serve to increase the resilience of the dried film. For radiation-curable printing inks, at least one photoinitiator or one photoinitiator system is further used as additive. Dispersants may be used for dispersing the effect pigments. By means of fatty acids, it is possible to achieve flotation of the effect pigments in the printed layer such that the pigments accumulate at the top boundary of the printed layer. Improved metallic effects can advantageously be achieved thereby. Furthermore, antisedimentation agents may also be added. Such additives prevent sedimentation of the effect pigments. Examples include silica, cellulose derivatives and waxes.

The addition of antisedimentation agents is generally advisable, although not always absolutely essential, when formulating the particularly preferred low-viscosity flexographic, gravure or screen printing inks. The total amount of all additives and auxiliaries should usually not exceed 20% by weight, based on the sum of all components of the printing ink, and is preferably from 0.1% to 10% by weight.

The preparation of the metallic printing inks of the invention can be carried out in a manner basically known by thorough mixing or dispersion of the components in conventional apparatus, for example dissolving tanks or stirred tanks. When dissolving tanks are used, a person skilled in the art will ensure that the energy input is not too high, in order to avoid damaging the metal effect pigments. Conversely, it must naturally be sufficiently high to permit proper dispersion of the pigments. If, in addition to the metal effect pigments of the invention, conventional colored pigments are also used, it may be advisable to predisperse them in a portion or all of the solvent, binder and any auxiliaries used in the metallic printing ink and to add the metal effect pigments of the invention at a later stage. In this way, particularly good dispersion of the additional pigments is achieved without damaging the metal effect pigments by unduly high dispersing forces. Instead of the pigments, predispersed pigment concentrates may be added. In a particularly elegant procedure, it is possible, in this case, to use a commercial printing ink in small quantities, provided that the added printing ink is compatible with the formulation of the metallic printing ink and does not adversely affect the properties thereof.

EXAMPLES

The following examples serve to provide a non-restrictive explanation of the invention.

Example 1 a) Atomization:

Aluminum bars are continuously fed to an induction crucible furnace (supplied by Induga, furnace capacity approximately 2.5 t) and melted therein. The aluminum melt is present in the so-called forehearth in a liquid state at a temperature of approximately 720° C. A number of injector-type nozzles dipping into the melt atomize the aluminum melt vertically upwardly. The motive gas is compressed in compressors (supplied by Kaeser) to up to 20 bar and heated in gas heaters to about 700° C. The resulting aluminum shot solidifies and cools down in flight. The induction crucible furnace is integrated in a closed plant. Atomization is carried out under inert gas (nitrogen). The aluminum shot is initially precipitated in a cyclone, and the pulverulent aluminum shot precipitated here has a $d_{50}$ of from 14 μm to 17 μm. A multicyclone serves to effect further precipitation, and the pulverulent aluminum shot precipitated in this multicyclone has a $d_{50}$ of from 2.3 μm to 2.8 μm. The gas/solids separation occurs in a filter (supplied by Alpine) having metal elements (supplied by Pall). Aluminum shot having a $d_{10}$ of 0.7 μm, a $d_{50}$ of 1.9 μm, and a $d_{90}$ of 3.8 μm is obtained as fines.

b) Grinding:

4 kg of glass spheres (diameter: 2 mm), 75 g of finest aluminum shot obtained under a), 200 g of white spirit, and 3.75 g of oleic acid are placed in a barrel mill (length 32 cm, breadth 19 cm). The mixture is then ground at 58 rpm for a period of 15 h. The product is separated from the grinding balls by rinsing with white spirit and subsequently screened in a wet screening process on a 25 μm screen. The fines are substantially freed from white spirit by means of a suction filter and subsequently worked to a paste with white spirit in a laboratory mixer (approx. 50% solids).

Example 2 a) Aluminum Shot:

Aluminum shot produced in accordance with Example 1 was used. The shot exhibits the following characteristics of its size distribution curve:

$d_{10,shot}$=0.7 μm; $d_{50,shot}$=1.6 μm; $d_{90,shot}$=3.2 μm.

b) Grinding:

4.7 kg of glass spheres (diameter: 2.0 mm), 67 g of finest aluminum shot obtained under 2a, 200 g of white spirit, and 10 g of oleic acid are placed in a barrel mill (length: 32 cm, breadth: 19 cm). The mixture is then ground at 43 rpm for a period of 22 h. The product is separated from the grinding balls by rinsing with white spirit and is subsequently screened in a wet screening process on a 25 μm screen. The fines are substantially freed from white spirit by means of a suction filter and subsequently worked to a paste with white spirit in a laboratory mixer (approx. 50% solids).

Comparative Example 3

Commercially available Metalure L-55350 (Eckart)

Comparative Example 4

Commercially available Silvershine S 2100 (Eckart), prepared as described in DE 103 15 775.

Comparative Example 5

Commercially available VP 53534 (Eckert), silver dollar pigment for lacquer.

Comparative Example 6

Commercially available RotoVario 530 080 (Eckert), silver dollar pigment for gravure printing.

Comparative Example 7

Commercially available RotoVario 500 042 (Eckert), silver dollar pigment for gravure printing.

The specimens of Examples 1 and 2 of the invention and Comparative Examples 3 to 5 were characterized for a closer determination of the particle thicknesses using a field ion scanning electron microscope.

The specimens were prepared for determining the thickness distribution by means of an SEM as described below:

a) Aluminum Pigments of the Invention and Conventional Pigments Obtained by Wet Grinding (Examples 1 and 2 and Comparative Examples 4 and 5)

The aluminum pigments of the invention and the conventional aluminum pigments obtained by conventional wet grinding are in each case present in the form of a paste or filter cake and are each first washed with acetone and then dried.

A resin customarily used in electron microscopy, for example TEMPFIX (Gerhard Neubauer Chemikalien, D-48031 Munster, Germany), is applied to a specimen plate and heated to softening temperature on a hotplate. Subsequently, the specimen plate is taken from the hotplate and the respective aluminum powder is scattered onto the softened resin. The resin resolidifies on cooling and the scattered aluminum pigments—due to the interplay between adhesion and the force of gravity—can be prepared extending almost vertically and fixed to the specimen plate. As a result, the pigments can be easily measured laterally in the electron microscope. When measuring the thickness, the azimuthal angle α of the pigment is estimated relative to a plane normal to the surface and is allowed for when evaluating the thickness according to the formula $h_{eff} = h_{mess}/\cos \alpha$ The cumulative breakthrough curve was plotted from the $h_{eff}$ values against the relative frequencies of occurrence. In all cases, 100 particles were counted.

b) PVD Pigments (Comparative Example 3)

A PVD pigment suspension was washed a number of times with a large excess of acetone in order to substantially free it from residues of the release coat. Subsequently, the PVD pigments were dispersed in acetone and a drop of the dispersion was distributed on a microscope slide. Following evaporation of the solvent, the slide was sliced. The individual slices can be vertically mounted in the electron microscope. At the sharp broken edges, sufficient PVD pigments can be measured. Again, 100 particles were counted.

The cumulative breakthrough curves of the thickness distribution of the example of the invention and Comparison Examples 3 to 5 are shown in FIG. 1. Statistical analyses showed that the cumulative breakthrough curve was substantially constant over from 75 to 100 particles for the pigments of the invention and conventional pigments obtained by wet grinding.

The $d_{10}$, $d_{50}$, and $d_{90}$ values and the span values of the size distribution (Cilas) calculated therefrom, the corresponding characteristics of the thickness measurement from SEM investigations, the span diameter/thicknesses calculated therefrom, the form factors f of the pigments, and the active metal contents are listen in Table 1 below.

The length d was determined with the aid of a laser granulometer (Cilas 1064, Cilas, France) and the $d_{50}$ index of the cumulative breakthrough distribution in μm was chosen as a measure of the mean length in the usual manner.

The pigments of Example 1 and Comparative Example 3 were subjected to an X-ray diffractometric investigation. The readings were taken using a powder diffractometer supplied by Thermoelektron (produced in Ecublens, Switzerland) of the type)(Iron. A copper tube was used as the X-ray source and the Cu—$K_{\alpha1,2}$ line was used for excitation. The device had a Bragg-Brentano measuring geometry.

For specimen preparation, the pigments were washed with acetone. Then a few drops of the pigment/acetone dispersion were applied to a rotary plate and dried at room temperature. The pigments thus orient themselves substantially parallel to the substrate.

The corresponding diffractograms are shown in FIGS. 2 and 3. The intensity of the X-rays measured is shown as a function of the measuring angle. Lines mark the positions of the reflexes of specific crystallographic planes as are to be expected according to the ICDD-(International Center for Diffraction Data).

The measuring period for recording a diffractogram was several hours. It can be clearly seen that the spectrum of Comparative Example 3 (PVD pigments, FIG. 3) exhibits appreciable peaks only in the [111] planes and [222] planes. The reflex of the [222] plane is the higher order of the [111] plane and is much weaker. These findings point to a largely monocrystalline structure of the pigment, with the densely packed [111] plane being present parallel to the platelet surface.

As can be seen from FIG. 2, the X-ray diffractogram of the example of the invention has a very pronounced main peak at the [200] plane. Furthermore, signals corresponding to the plane and—in a much weaker manner—to the [111] and the [311] planes can be seen. The intensity of all signals is clearly weaker than in the case of the PVD pigment in spite of a longer integration time. Accordingly, the crystalline character of this pigment obtained by wet grinding is, on the whole, much weaker. These reflexes are characteristic of an aluminum pigment in a state of plastic deformation and therefore reflect the physical state of an aluminum pigment during or after grinding.

TABLE 1

| | | Physical characteristics | | | | |
|---|---|---|---|---|---|---|
| Specimen | Length $D_{10}$ $d_{50}$ $d_{90}$ [μm] | Span Length $[(d_{90} - d_{10})/d_{50}]$ | Particle thickness distribution from SEM $h_{10}$ $h_{50}$ $h_{90}$ [nm] | Span Thickness $[(h_{90} - h_{10})/h_{50}]$ | Form factor | Active metal content [%] |
| Example 1 | 7.1 13.0 20.0 | 0.99 | 35 54 70.2 | 0.67 | 245 | 87 |
| Example 2 | 5.1 9.2 14.2 | 0.99 | 22 32 43 | 0.65 | 288 | 81 |
| Comp. Example 3 | 5.7 12.7 20.7 | 1.18 | 38 47 52 | 0.31 | 270 | — |
| Comp. Example 4 | 11.3 20.1 32.4 | 1.05 | 46 74 145 | 1.36 | 272 | 95 |

TABLE 1-continued

Physical characteristics

| Specimen | Length $D_{10}\ d_{50}\ d_{90}$ [μm] | Span Length $[(d_{90} - d_{10})/d_{50}]$ | Particle thickness distribution from SEM $h_{10}\ h_{50}\ h_{90}$ [nm] | Span Thickness $[(h_{90} - h_{10})/h_{50}]$ | Form factor | Active metal content [%] |
|---|---|---|---|---|---|---|
| Comp. Example 5 | 9.8 17.2 26.9 | 0.99 | 55 137 330 | 2.01 | 126 | 97 |
| Comp. Example 6 | 6.0 11.5 20.5 | 1.26 | 159 | — | 72 | 92 |
| Comp. Example 7 | 7.3 15.7 26.6 | 1.23 | — | — | — | 96 |

The following Table 2 lists the colorimetric data of wet lacquer coatings of selected examples.

The reverse-side applications in Table 2 were prepared using a gravure printing ink based on a commercially available polyvinyl butyral by imprinting a MELINEX 400 film (PET film, 50 μm) firstly by means of a doctor blade having a blade gap of 24 μm and secondly by means of a printing machine (printing machine: Rotova 300, supplied by Rotocolor, 3 inking units; printing speed 100 m/min, viscosity 15 s DIN 4 flow cup; 70 lines/cm; pigmentation level depending on particle thickness between 3.5% (Example 3) and 14.5% (Example 7).

The reverse-side applications were characterized optically by gloss measurement at 60° following DIN 67 530 (apparatus: micro-TRI gloss manufactured by Byk-Gardner, D-82538 Geretsried, Germany). The apparatus was calibrated for this purpose by means of dark calibration and a black mirror glass plate with values of 92 at 60°.

The evaluation of the gloss measurement carried out at 60° in the conventional manner shows that the pigments prepared according to Examples 1 and 2 of the invention exhibit a far higher gloss than conventional pigments obtained by conventional wet grinding (see Comparative Examples 6 and 7).

The visual impression of the pigments prepared according to Examples 1 and 2 of the invention is also distinguished by a very intensely metallic mirror effect—similar to that observed in PVD pigments (see Comparative Example 3).

The gloss of the pigments of the invention in this application approximately corresponds to that of PVD pigments (see Comparative Example 3).

In Comparative Examples 4 and 5, the reverse-side application could not be carried out to satisfaction by means of gravure printing. The pigments exhibited a transfer behavior that was inadequate in the gravure printing process owing to their particle size. Reverse-side applications could only be achieved by means of a doctor blade. The doctor blade technique, however, is not applicable for commercial purposes in most cases. In the case of Comparative Example 4, a high gloss and metallic effect were likewise achieved with the applications made by doctor blade, but no mirror effect.

The conventional silver dollar pigments for gravure printing represented by Comparative Examples 5 and 6 exhibit much less gloss and by no means approach the mirror effect pertaining to Examples 1 and 2 or Comparative Example 3.

The results of the calorimetric measurements prove that, on account of their small thickness and low thickness distribution, the pigments of the invention show, similarly to PVD pigments, extremely good orientation and thereby very high direct reflection, i.e. a high degree of gloss measured at 60°.

TABLE 2

Reverse-side application on MELINEX film

| | Reverse-side application by printing | | Reverse-side application by doctor blade | |
|---|---|---|---|---|
| Specimen | Gloss 60° | Visual impression | Gloss 60° | Visual impression |
| Example 1 of the invention | 643 | very metallic, "mirror effect" | 619 | Very metallic "mirror effect" |
| Example 2 of the invention | 660 | very metallic, "mirror effect" | 650 | very metallic, "mirror effect" |
| Comp. Example 2 | 677 | very metallic "mirror effect" | 672 | very metallic "mirror effect" |
| Comp. Example 3* | — | — | 504 | metallic |
| Comp. Example 4* | — | — | 366 | metallic, white |
| Comp. Example 5 | 494 | metallic | 445 | metallic |
| Comp. Example 6 | 339 | metallic, white | 267 | metallic, white |

*These specimens could not be applied since the transfer behavior was inadequate.

Examples concerning the passivation of the aluminum pigments of the invention:

Example 8: (SiO$_2$-Coated Aluminum)

55.1 g of a paste containing aluminum pigments as described in Example 1 (equivalent to 38.5 g of Al) were dispersed in 375 ml of isopropanol and brought to the boil. 13.35 g of tetraethoxysilane were added. Subsequently, a solution of 5.4 g of 25% strength NH$_3$ in 9.3 g of water was metered in over a period of 3 h. After a further 3 h, the mixture was cooled to room temperature and the suspension was filtered off with suction by means of a Buchner funnel. Subsequently, the product was dried overnight in a vacuum drying oven at 100° C.

Example 9: Chromated Aluminum 18 g of a chromic acid solution were prepared by dissolving 4.5 g of CrO$_3$ in 13.5 g of demineralized water.

220 g of demineralized water were heated to 90° C. in a reactor having a capacity of 1 liter. With vigorous stirring (stirring unit: Stollenscheibe), first 21 g of butyl glycol were added and then 125 g of the aluminum pigments described in Example 1 in the form of a white spirit paste having a solids content of 70%. A few minutes later, the chromic acid solution was added at a reaction temperature of 80° C. The mixture was allowed to react for a further 50 min with vigorous stirring. The reaction mixture was then allowed to cool for 30 min and decanted into a beaker a number of times with 250 mL of a 5% strength demineralized H$_2$O/butyl glycol solution each time until yellow coloration of the supernatant solution no longer occurred. The product was then filtered off in a suction filter and washed with approx. 3 liters of water.

Gassing Test 8.6 g of Al were incorporated in the form of a paste into 315 g of a commercially available colorless water-based lacquer and adjusted to pH 8.2 with dimethanol-ethanolamine. 300 g of this lacquer were filled into a gas wash bottle and this was closed with a double-chamber gas bubble counter. The amount of gas could be determined from the amount of water displaced in the lower chamber of the gas bubble counter. The gas wash bottle was temperature-controlled at 40° C. in a water bath and the test was carried out over a period of 30 days. The specimen was regarded as having passed the test if after 7 days not more than 4 mL, and after 30 days not more than 20 mL, of hydrogen had evolved.

TABLE 3

Results of gassing test on coated thin aluminum pigments

| Specimen | Gassing for 7 d | Gassing for 30 d |
|---|---|---|
| Example 8 | 1 mL | 7 mL |
| Example 9 | 1 mL | 4 mL |
| Comp. example (uncoated pigment of Example 1) | <3 h !! | — | d: days

It can be seen from Table 3 that the aluminum pigments of the invention can be extremely well stabilized against corrosion.

Example 10 (Nail Varnish)

Aluminum shot was atomized and then ground as in Example 1. Fatty acids of vegetable origin were used as lubricants. The pigment was washed five times with isopropanol by means of a Buchner funnel in order to remove residues of white spirit originating from the wet grinding process.

Subsequently, nail varnishes of the following composition were prepared from this pigment and from Comparative Example 3:

TABLE 4

Nail varnish formulations:

| No. | Substance | Example 10 | Comparative Example 11 |
|---|---|---|---|
| 1 | | Metal pigment of Example 10 19% by weight | Metalure ® CA-41010 AE* |
| 2 | Methyl ethyl ketone | 21% by weight | 21% by weight |
| 3 | Methyl isobutyl ketone | 20% by weight | 20% by weight |
| 4 | CAB 381.2 | 8% by weight | 8% by weight |
| 5 | Butyl acetate 98/100 | 32% by weight | 32% by weight |

*Commercially available PVD pigments for cosmetic purposes (supplied by Eckart)

The nail varnishes in accordance with Example 10 and Comparative Example 11 were applied to an artificial fingernail. Both applications showed a highly glossy, silvery, continuous metal film resembling a "liquid metal". Comparative Example 11, however, exhibited slightly higher gloss.

The invention relates to aluminum pigments, which in their physical properties come very close to the PVD pigments, but can be prepared in a significantly simpler manner. Finally, the aluminum pigments of the invention do not show any tendency to agglomerate, which is a drawback of PVD pigments. Compared with conventional aluminum pigments, the aluminum pigments of the invention exhibit very improved properties, in particular as regards their covering power and their gloss. In particular, in reverse-side applications in the printing sector, the aluminum pigments of the invention exhibit properties that are comparable to those of PVD pigments. This had hitherto not been achieved by pigments obtained by wet grinding.

The invention claimed is:

1. Platelet-like aluminum pigments having a narrow thickness distribution and at least partially coated with lubricant, wherein the pigments have a) a mean thickness $h_{50}$ of from 15 nm to 75 nm as determined by a scanning electron microscope thickness count,
b) a relative breadth of thickness distribution $\Delta h$ of from 30% to 65%, as determined by a scanning electron microscope thickness count and as calculated on the basis of the corresponding cumulative breakthrough curve of the relative frequencies of occurrence, according to the formula $\Delta h = 100 \times (h_{90} - h_{10})/h_{50}$, and
c) an X-ray diffractogram, measured on pigments in substantially plane-parallel orientation, having one or two main peaks which do not correspond to the reflexes.

2. The platelet-type aluminum pigments according to claim 1, wherein said aluminum pigments are produced by grinding processes.

3. The platelet-type aluminum pigments according to claim 1 wherein said aluminum pigments exhibit a relative breadth of said thickness distributions $\Delta h$ of from 35% to 65%.

4. The platelet-type aluminum pigments as defined in claim 1, wherein the aluminum pigments have a form factor $d_{50}/h_{50}$ of from 200 to 1500.

5. The platelet-type aluminum pigments as defined in claim 1, wherein the X-ray diffractogram has one or two peaks of maximum intensity assignable to at least one of the and reflexes.

6. The platelet-type aluminum pigments as defined in claim 1, wherein the aluminum pigments are coated at least partially with fatty acids as lubricants.

7. The platelet-type aluminum pigments as defined in claim 1, wherein the aluminum pigments are coated at least partially with stearic acid as lubricant.

8. The platelet-type aluminum pigments as defined in claim 1, wherein said aluminum pigments are coated at least partially with oleic acid as lubricant.

9. The platelet-type aluminum pigments as defined in claim 1, wherein said aluminum pigments are coated at least partially with a mixture of stearic acid and oleic acid as lubricants.

10. The platelet-type aluminum pigments as defined in claim 1, wherein said aluminum pigments are at least partially coated with phosphonic acids, phosphates, or a mixture thereof as lubricants.

11. The platelet-type aluminum pigments as defined in claim 1, wherein the aluminum pigments are coated with a passivating inhibitory layer or anticorrosive layer.

12. The platelet-type aluminum pigments as defined in claim 11, wherein said passivating inhibitory layer comprises at least one selected from the group consisting of anticorrosive organic phosphonic acids and phosphoric acid esters, organically functionalized silanes, aliphatic and cyclic amines, aliphatic and aromatic nitro compounds, heterocyclic compounds containing at least one heterocyclic atom selected from the group consisting of oxygen, sulfur and nitrogen, and sulfur and nitrogen compounds of higher ketones, aldehydes, and alcohols, thiols, and mixtures thereof.

13. The platelet-type aluminum pigments as defined in claim 11, wherein said passivating anti-corrosive layer comprises at least one selected from the group consisting of silicon dioxide, zirconium oxide, aluminum oxide, chromium oxide, polymerized synthetic resins, vanadium oxides, molybdenum oxides and peroxides, phosphates, phosphates, borates, and mixtures and combinations thereof.

14. The platelet-type aluminum pigments as defined in claim 13, wherein said passivating anti-corrosive layer comprises silicon dioxide.

15. The platelet-type aluminum pigments as defined in claim 1, wherein the aluminum pigments are oxidized by water in a chemical wet process and the aluminum pigments have a colored appearance.

16. The platelet-type aluminum pigments as defined in claim 1, wherein the aluminum pigments exist as powders.

17. A method for the production of aluminum effect pigments as defined in claim 1, wherein the method comprises the following steps:
a) providing aluminum shot exhibiting a particle size distribution having a $d_{shot,10} < 3.0$ μm, a $d_{shot,50} < 5.0$ μm, and a $d_{shot,90} < 8.0$ μm,
b) grinding the aluminum shot defined under a) using a grinder in the presence of solvent and lubricants and grinding media having an individual weight of from 1.2 mg to 13 mg.

18. The method as defined in claim 17, wherein said grinding media have an individual weight of from 5.0 mg to 12 mg.

19. The method as defined in claim 17 wherein said aluminum shot as produced according to step a) has a particle size distribution having a $d_{shot,10} < 0.6$ μm, a $d_{shot,50} < 2.0$ μm, and a $d_{shot,90} < 4.0$ μm.

20. The method as defined in claim 17, wherein the grinding time is from 15 to 100 hours.

21. The method as defined in claim 17, wherein said aluminum pigments are subjected in a further step (c) to size classification.

22. The method as defined in claim 17, wherein the aluminum pigments provided in said step b) are converted to a compact form.

23. The method as defined in claim 17, wherein the aluminum pigments provided in said step b) are converted to an aluminum powder.

24. The method as defined in claim 17, wherein the solvents used are organic solvents.

25. The method as defined in claim 17, wherein the solvent used is water and the lubricants used are at least one selected from the group consisting of organic phosphonic acids and esters thereof and phosphoric acids and esters thereof.

26. A cosmetic formulation, wherein said cosmetic formulation contains aluminum pigments as defined in claim 1.

27. A printing ink, wherein said printing ink contains aluminum pigments as defined in claim 1.

28. The cosmetic formulation of claim 26, wherein the formulation is a nail varnish.

29. A water-based lacquer, wherein said lacquer contains coated aluminum pigments as defined in claim 11.

30. A coating composition adapted for exterior application, wherein said coating contains coated aluminum pigments as defined in claim 11.

31. A method for producing a composition selected from the group consisting of coating, lacquers, printing inks, powder-based ceramics and cosmetic formulations, said method comprising incorporating aluminum pigments as defined in claim 1 in said composition.

32. The platelet-type aluminum pigments defined in claim 14, wherein a surface of the silicon dioxide layer is coated with silanes.

33. The platelet-type aluminum pigments as defined in claim 16, wherein the powder is a non-dusting powder.

34. The platelet-type aluminum pigments as defined in claim 16, wherein the powder is in a paste or in a compacted form selected from the group consisting of granules, pellets, tablets, small cylinders and briquets.

35. The method as defined in claim 22, which further comprises selecting the compact form from the group consisting of paste, granules, tablets, small cylinders, briquets and pellets.

36. The method as defined in claim 23 wherein the aluminum powder is a non-dusting aluminum powder.

37. The method as defined in claim 24, which further comprises selecting the organic solvent from the group consisting of white spirit, solvent naphtha, isopropanol, alcohols, ketones and mixtures thereof.

38. A method for producing a reverse-side application in at least one selected from the group consisting of gravure printing, flexographic printing and screen printing, the method comprising printing on a transparent film with a printing ink comprising aluminum pigments according to claim 1.

* * * * *